United States Patent [19]

Imamura et al.

[11] Patent Number: 4,680,592

[45] Date of Patent: Jul. 14, 1987

[54] IMAGE FORMATION METHOD SUBLIMING INK THROUGH A GAS PERMEABLE MEMBRANE

[75] Inventors: Masanaga Imamura, Fujinomiya; Isao Mizuno, Gotenba, both of Japan

[73] Assignee: Ricoh Co., Ltd., Tokyo, Japan

[21] Appl. No.: 843,942

[22] Filed: Mar. 25, 1986

[30] Foreign Application Priority Data

Apr. 17, 1985 [JP] Japan ................................. 60-82007

[51] Int. Cl.$^4$ ......................... G01D 9/00; G01D 15/10

[52] U.S. Cl. .................................... 346/1.1; 346/76 R

[58] Field of Search .............. 346/76 R, 76 PH, 76 L, 346/1.1

[56] References Cited

U.S. PATENT DOCUMENTS 4,561,789 12/1985 Saito .............................. 346/76 PH 4,609,566 9/1986 Homgo ............................ 346/76 L

*Primary Examiner*—E. A. Goldberg

*Assistant Examiner*—Mark Reinhart

*Attorney, Agent, or Firm*—Flynn, Thiel, Boutell & Tanis

[57] ABSTRACT

An image formation method wherein a thin film of a dyestuff liable to sublime or gasify is formed on a gas permeable film, and a heating element adjacent the back of the gas permeable film is heated in response to an image signal to generate from the dyestuff thin film a dyestuff gas flow which is representative of an image and which permeates through the gas permeable film so that the dyestuff deposits on acceptor paper adjacent the gas permeable film to form the image on the back of the acceptor paper.

1 Claim, 4 Drawing Figures

IMAGE FORMATION METHOD SUBLIMING INK THROUGH A GAS PERMEABLE MEMBRANE

BACKGROUND OF THE INVENTION

1. Field of the Invention

This invention generally relates to an image formation method and move particularly to an image formation method based on thermal transfer, as applicable to copying machines and facsimile, which can dispense with any base film.

2. Description of the Prior Art

Conventionally, the thermal transfer image formation method requires a base film in the form of a thermal transfer film. Disadvantageously, the thermal transfer film can not be used repetitiously and besides, it will soil portions of acceptor paper or a recording medium on which images are not formed. In order to obviate these disadvantages, such a method as disclosed in Japanese Patent Unexamined Publication No. 60-4093 has been proposed. To outline this prior art method, thermally dissoluble semisolid ink supported by a filter material is dissolved by selectively heating it in response to an image signal so as to be transferred to a recording medium through the filter material.

In this prior art method, however, it is uncertain whether only imaging portions of the semisolid ink can sufficiently be heated with a small amount of energies applied by way of an electrode or a thermal head, and after printing, the dissolved ink will remain in the filter and tends to soil the texture of the recording medium.

SUMMARY OF THE INVENTION

This invention contemplates elimination of the drawbacks of the prior art image formation method and has for its object to provide an image formation method which can dispense with the transfer film, sufficiently heat only imaging portions with a small amount of energies from the thermal head and prevent the texture of the acceptor paper from being soiled.

To accomplish the above object, according to this invention, a thin film of a dyestuff liable to sublime or gasify is formed on the back surface of a gas permeable film, and a heating element adjacent the back surface of the gas permeable film is heated in response to a signal indicative of an image to generate from the dyestuff thin film a dyestuff gas flow which is representative of the image and which permeates through the gas permeable film so that the dyestuff deposits on acceptor paper adjacent the front surface of the gas permeable film to form the image on the back surface of the acceptor paper.

DESCRIPTION OF THE PREFERRED EMBODIMENT

Figure 1:
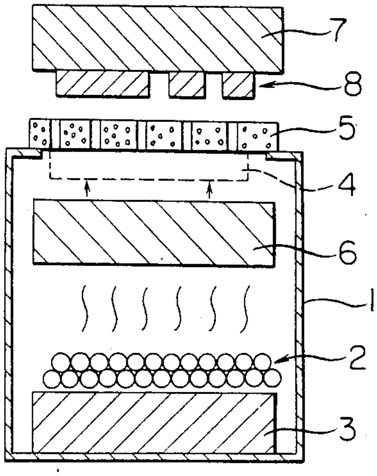
FIG. 1 is a schematic sectional view for explaining the principle of the invention.

Referring now to FIG. 1, a dyestuff 2 liable to sublime or gasify is introduced into a container 1. The dyestuff 2 is heated by a heater 3 placed inside the container 1 so as to be sublimated or gasified. As a result, a thin film 4 of the dyestuff is formed on the back of a gas permeable film 5 which covers an opening of the container 1. A heating element 6 adjacent the gas permeable film 5 is heated in response to a signal indicative of an image to generate from the dyestuff thin film a dyestuff gas flow which is representative of the image and which permeates through the gas permeable film 5 so that the dyestuff deposits on acceptor paper 7 adjacent the front surface of the gas permeable film to form the image, as denoted by reference numeral 8, on the back surface of the acceptor paper. In an alternative, the dyestuff may be sublimated or gasified by means of an external device and a sublimated or gasified dyestuff may be admitted to the back of the gas permeable film 5 through a pipe so that the thin film of the dyestuff may be formed on the back surface of the gas permeable film 5.

Figure 2:
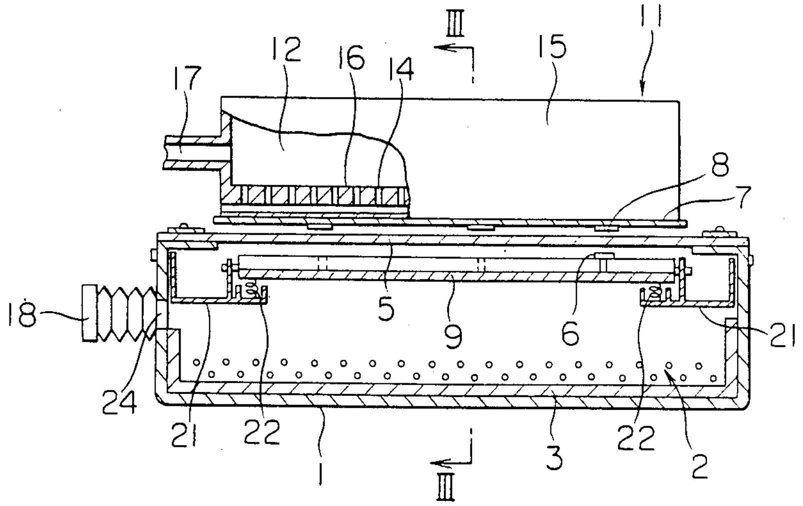
FIG. 2 is a front view, in longitudinally partially sectioned form, showing an example of an image formation apparatus used for implementing a method according to this invention.
Figure 3:
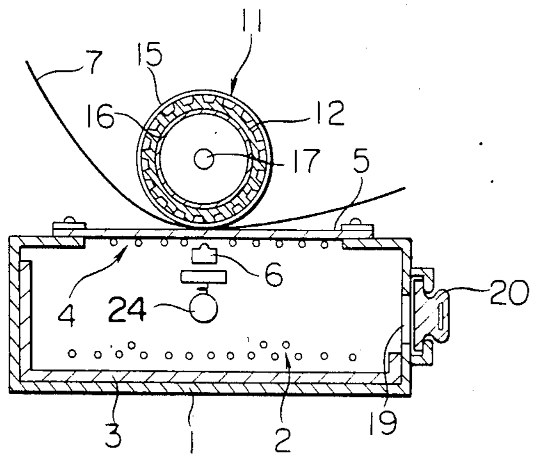
FIG. 3 is a sectional view taken on line III—III and as viewed in arrow direction in FIG. 2.
Figure 4:
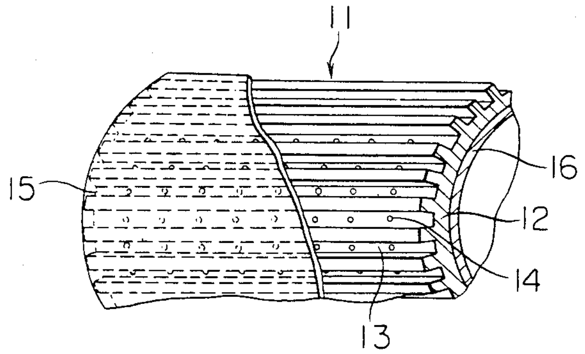
FIG. 4 is a fragmentary perspective view, partly exploded, of a platen used in the image formation apparatus of FIG. 2.

An example of an image formation apparatus used for implementing the method according to the invention is illustrated in FIG. 2 and the ensuing figures wherein identical parts to those of FIG. 1 are designated by identical reference numerals. In the following description, these identical parts will not be described for avoidance of prolixity and the other components will be explained.

A platen 11 has a cylindrical body 12 whose outer peripheral surface is formed with a plurality of parallel grooves 13 which extend in the longitudinal direction. A plurality of perforations 14 are formed in each groove 13 at predetermined intervals. A porous film 15, which is similar to the gas permeable film 5, is wound about the outer peripheral surface of the cylindrical body 12. A heater plate roll 16 is fitted on the inner peripheral surface of the cylindrical body 12. An evacuation port 17 is connected to a negative pressure source not shown.

Formed in one end wall of container 1 is an opening 24 with which an inner pressure relief valve 18 communicates which relieves an increase in inner pressure within the container 1 due to gasification of part of the dyestuff 2. Formed in the other end wall of the container 1 is an opening 19 through which the dyestuff 2 is fed into the container 1. The opening 19 is covered with a lid 20.

The heating element 6 has the same construction as the conventional thermal head, having a plurality of heating portions (imaging or printing portions) in the form of dot-like projections which are selectively heated by a signal produced from an image generator not shown. The heating element 6 is supported by a guide 9 which is urged upwards by means of springs 22 mounted on supports 21 fixed to the inner wall surface of the container 1. Consequently, the heating element 6 is normally biased toward the gas permeable film 5.

When forming an image on the acceptor paper 7 with the image formation apparatus described above, the dyestuff 2 charged into the container 1 through the opening 19 is heated by the heater 3 and gasified. Heating temperatures by the heater 3 are adjusted such that gasified dyestuff molecules have active energies which are not so high as to permit the molecules to permeate through the gas permeable film 5, and the atmosphere within the lower part of the container 1 excepting the gas permeable film 5 is raised to such regulated temperatures. As a result, the dyestuff deposits on the gas permeable film 5, not heated, to form the film 4 of the dyestuff.

Subsequently, the heating element 6 is selectively applied with a voltage of an image signal to thereby generate Joule heat and consequently, there occurs a dyestuff gas flow containing highly active fine particles of normally about two molecular units. The dyestuff gas flow permeates through the gas permeable film 5 and the dyestuff deposits on the back of the acceptor paper 7.

During the above procedures, the body 12 of platen 11 is heated by means of the heater plate roll 16 to raise temperatures in the acceptor paper 7, thereby promoting gasification of the dyestuff to provide a large amount of dyestuff gas flow which permeates through the gas permeable film 5; in addition, the formation of the image on the acceptor paper 7 can be promoted by evacuating the gasified dyestuff through perforations 14 formed in the grooves 13, perforations formed in the acceptor paper 7 and evacuation port 17.

The following is a description of modes of printing to be carried out with the apparatus of this invention. In a serial printing mode, dyestuff images can sequentially be printed on the acceptor paper 7 by rotating the platen 11 so as to shift the acceptor paper 7 digit by digit. Before the initial printing portion recovers for the second time, the initial dyestuff image has already been transferred and hence the desired printing portions can always be ready for printing.

In a line printing mode, the dyestuff can be deposited sufficiently on the acceptor paper 7 by setting the distance between gas permeable film 5 and heating element 6 to be about 5 to 10μ. With a view of promoting deposition of the dyestuff on the back on the gas permeable film 5, however, the distance between the two members may be increased when printing is not carried out and may be decreased until the above critical value only when printing is carried out.

As described above, since according to the invention, the dyestuff liable to sublime or gasify is heated to from the thin film of the dyestuff on the back of the gas permeable film and the dyestuff thin film is then heated by the heating element in response to an image signal to form an image on the acceptor paper, only imaging portions can be heated by merely supplying a small amount of energies to the heating element and the texture of acceptor paper can be prevented from being soiled.

Although a particular preferred embodiment of the invention has been disclosed in detail for illustrative purposes, it will be recognized that variations or modifications of the disclosed apparatus and method, including the rearrangement of parts, lie within the scope of the present invention.

What is claimed is:

1. An image formation method utilizing a dyestuff liable to sublime or gasify, said method comprising the steps of:

forming a thin film of said dyestuff on the back surface of a gas permeable film; and heating a heating element adjacent the back surface of said gas permeable film in response to a signal indicative of an image to generate from said dyestuff thin film a dyestuff gas flow which is representative of the image and which permeates through said gas permeable film so that said dyestuff deposits on acceptor paper adjacent the front surface of said gas permeable film to form the image on the back surface of said acceptor paper.

* * * * *